(12) United States Patent
Ziemer et al.

(10) Patent No.: US 8,062,168 B2
(45) Date of Patent: Nov. 22, 2011

(54) ARRANGEMENT OF A PLANETARY GEARSET WITH AN AXIALLY ADJACENT SHIFT ELEMENT IN A TRANSMISSION

(75) Inventors: Peter Ziemer, Tettnang (DE); Hermann Maier, Kressbronn (DE); Jörg Brockstieger, Kleinbleittersdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 651 days.

(21) Appl. No.: 12/189,915

(22) Filed: Aug. 12, 2008

(65) Prior Publication Data

US 2009/0069141 A1    Mar. 12, 2009

(30) Foreign Application Priority Data

Sep. 7, 2007    (DE) .......................... 10 2007 042 713

(51) Int. Cl.
*F16H 57/08* (2006.01)
*F16H 31/00* (2006.01)
*B60W 10/02* (2006.01)

(52) U.S. Cl. .................. 475/331; 475/116; 192/3.52

(58) Field of Classification Search ............... 475/86, 475/116, 138, 269, 331, 346, 347; 74/333; 192/3.52

See application file for complete search history.

(56) References Cited

U.S. PATENT DOCUMENTS

| | | | |
|---|---|---|---|
| 2,998,735 A * | 9/1961 | Elfes ........................... | 475/346 |
| 6,074,323 A * | 6/2000 | Collins et al. ............... | 475/331 |
| 6,086,504 A * | 7/2000 | Illerhaus ..................... | 475/347 |
| 7,070,532 B2 * | 7/2006 | Stevenson et al. .......... | 475/116 |
| 7,628,723 B2 * | 12/2009 | Bauknecht et al. ......... | 475/275 |
| 2006/0160654 A1 * | 7/2006 | Tiesler et al. ............... | 475/331 |
| 2006/0287152 A1 * | 12/2006 | Bishop et al. ............... | 475/159 |
| 2007/0293363 A1 * | 12/2007 | Bauknecht et al. ......... | 475/276 |

FOREIGN PATENT DOCUMENTS

DE    20 2006 014 562 U1    2/2007

* cited by examiner

*Primary Examiner* — Roger Pang
(74) *Attorney, Agent, or Firm* — Davis & Bujold, P.L.L.C.

(57) ABSTRACT

An arrangement of a planetary gearset (2) with an axially adjacent shift element in a housing (1) of a transmission of a vehicle. The planetary gearset (2) is connected to the shift element in a detachable manner.

17 Claims, 4 Drawing Sheets

Variant

ARRANGEMENT OF A PLANETARY GEARSET WITH AN AXIALLY ADJACENT SHIFT ELEMENT IN A TRANSMISSION

This application claims priority from German Application Serial No. 10 2007 042 713.3 filed Sep. 7, 2007.

FIELD OF THE INVENTION

The present invention concerns an arrangement of a planetary gearset with an axially adjacent shift element in a housing of a transmission.

BACKGROUND OF THE INVENTION

From the document DE 20 2006 014 562 U1, an arrangement of a planetary gearset with an axially adjacent shift element as components of an automatic transmission of planetary structure for a motor vehicle is known. The planetary gearset consists of a planetary gear carrier and planetary gears, which are mounted on the planetary gear carrier by means of planetary gear bolts. The planetary gear carrier comprises among other things a carrier plate by which the planetary gearset is connected to the adjacent shift element for torque transfer.

The shift element that is axially adjacent the planetary gearset is a clutch. To actuate this clutch, it comprises an annular cylinder that cooperates with an annular piston to form a pressure chamber. In the known arrangement, the connection of the clutch to the carrier plate of the planetary gear carrier is formed by riveting the annular cylinder of the clutch to the carrier plate of the planetary gear carrier. This riveting forms a permanent joint between the annular cylinder of the clutch and the web plate or guide disk of the planetary gearset so that, even if only one component within this structural group is defective, the entire planetary gearset has to be replaced.

Accordingly, the purpose of the present invention is to improve an arrangement of the generic type described to begin with in such a manner that rejection costs are reduced.

SUMMARY OF THE INVENTION

According to the invention, an arrangement of a planetary gearset with an axially adjacent shift element in a housing of a transmission is proposed, such that the planetary gearset is detachably connected with the shift element. This detachable connection, between the shift element and the gearset, provides the possibility of retrofitting individual components of the shift element and the planetary gearset and even removal of the planetary gears. In this way, the costs of waste are considerably reduced since only the defective components are replaced. In addition, recycling of the transmission is greatly simplified thanks to the arrangement according to the invention.

In an advantageous embodiment, it can be provided that in the proposed arrangement a clutch with a cup-spring-loaded diaphragm plate is provided as the shift element, which is preferably detachably connected to a carrier plate of a planetary gear carrier of the planetary gearset. Thus, the diaphragm plate of the clutch is connected in a rotationally fixed manner to the carrier plate of the planetary gearset.

As the detachable connection, e.g., a bayonet connection or suchlike, can preferably be provided. The bayonet connection, between the carrier plate and the diaphragm plate, can be designed in various ways to produce a rotationally fixed connection between the carrier plate and the diaphragm plate. For example, even an only segmentary structure of the bayonet interlock, such as in the area between the planetary gears, can be provided.

A possible embodiment of the invention can provide that the diaphragm plate has, as it were, an approximately disk-shaped main body which comprises a sleeve section extending in the axial direction or suchlike, which is detachably connected with the inside diameter of the carrier plate.

In this embodiment, one or more radial projections can be provided on the outer circumference of the sleeve section of the diaphragm plate which, to reach a desired operating position of the diaphragm plate, are respectively inserted into one or more corresponding axial mounting recesses in the inside diameter of the carrier plate. When more than one projection is used, these can have different widths in the circumferential direction so that the corresponding mounting recesses fit the respective widths of their associated projections. This prevents erroneous mounting of the diaphragm plate on the carrier plate.

To maintain a rotationally fixed connection between the components once the sleeve section of the diaphragm plate has been introduced axially into the carrier plate, according to a possible embodiment, it can be provided that the carrier plate has in its inside diameter at least one first recess in the circumferential direction for rotating the diaphragm plate and at least one second recess that is limiting in the circumferential direction for the rotationally fixed positioning of the diaphragm plate. The recesses can be formed by (axial) gaps in the carrier plate. Other designs are also possible.

To fit on the diaphragm plate, the projections on its sleeve section can be inserted in the axial direction against the force of the cup spring into the axially extending mounting recesses of the carrier plate. Then the narrower projections of the sleeve section of the diaphragm plate can be moved out of the mounting recesses beyond the first recess by rotating the diaphragm plate in the circumferential direction by a predetermined angle in order then, by virtue of the cup spring force, to become locked in a rotationally fixed position in the circumferentially limited and axially deeper second recesses. This closes the bayonet connection and effectively prevents any back-rotation of the diaphragm plate.

A further embodiment of the present invention can provide that the bayonet connection is made by forming at least one first radial projection on the sleeve section of the diaphragm plate, which is brought axially in contact against the carrier plate and at least one second radial projection which is introduced axially into a corresponding axial recess in the inside diameter of the carrier plate. It is also possible to provide a plurality of axial recesses in the manner of teeth or suchlike in the inside diameter of the carrier plate.

To produce a rotationally fixed connection between the diaphragm plate and the carrier plate in this embodiment as well, it can be provided that, relative to the first projection the second projection is arranged offset in the axial direction and in the circumferential direction of the carrier plate. Other design solutions are also conceivable. However, the embodiment mentioned above has the advantage that the carrier plate can be made in a particularly simple manner.

For assembly in the case of the above embodiment, the projections of the diaphragm plate are inserted through the carrier plate against the force of the cup spring in order to rotate the diaphragm plate by a predetermined angle in such a manner that, because of the cup spring force, the second projection can be inserted axially into the corresponding second recess of the carrier plate which is deeper in the axial direction, until the second projection is held rotationally fixed in the second recess limited in the circumferential direction.

Regardless of the embodiment chosen, to detach the diaphragm plate it is pressed against the force of the cup spring out of its rotationally fixed position and then twisted out so that the sleeve section of the diaphragm plate can be moved axially out of the carrier plate in the direction of the cup spring force.

A further aspect of the present invention is that the planetary gear bolts fitted into the carrier plate of the planetary gearset are fixed axially, at least in the direction of the clutch, by the cup spring force transferred to the carrier plate. By virtue of the diaphragm plate designed according to the invention, with its sleeve section, the force of the cup spring of the clutch can also be used additionally for the axial securing of the planetary gear bolts of the planetary gearset. It is also possible to use a positive-lock connection to fix the planetary bolts axially. Preferably, for that purpose at least one circlip or suchlike can be provided on at least one planetary bolt. Other design solutions are also conceivable.

Another further development of the invention can provide that to simplify the design of the arrangement according to the invention still more, the diaphragm plate has on the inside diameter of its sleeve section an annular channel or suchlike extending around the circumference as an oil trap. By virtue of the annular channel provided, an otherwise necessary and structurally elaborate oil collection sleeve can be omitted. The annular channel can be produced by deformation or creasing, preferably on the outside diameter of the sleeve section of the diaphragm plate. The creasing can be carried out by pressing from the outside inward on the sleeve section of the diaphragm plate.

Another design feature of the invention enables improved lubrication oil supply by way of an overflow or suchlike on the hydrodynamic pressure equalizer. The overflow can be produced on the inside diameter of the annular cylinder. Preferably, the wall section of the annular cylinder of the clutch that faces the inside diameter of the sleeve section of the diaphragm plate can have around its circumference at least one axial recess as the overflow. This recess can be made as a window or groove or suchlike. By using one or more recesses, several bores in the drive shaft and the hollow shaft of the transmission can advantageously be omitted.

The arrangement proposed can preferably be used in an eight-gear automatic transmission. For example, the carrier plate of the fourth planetary gearset can be connected detachably to the diaphragm plate of the adjacent clutch. However, the detachable connection can also be used with other gearsets as well.

BRIEF DESCRIPTION OF THE DRAWINGS

The invention will now be described, by way of example, with reference to the accompanying drawings in which.

DETAILED DESCRIPTION OF THE INVENTION

Figure 1:
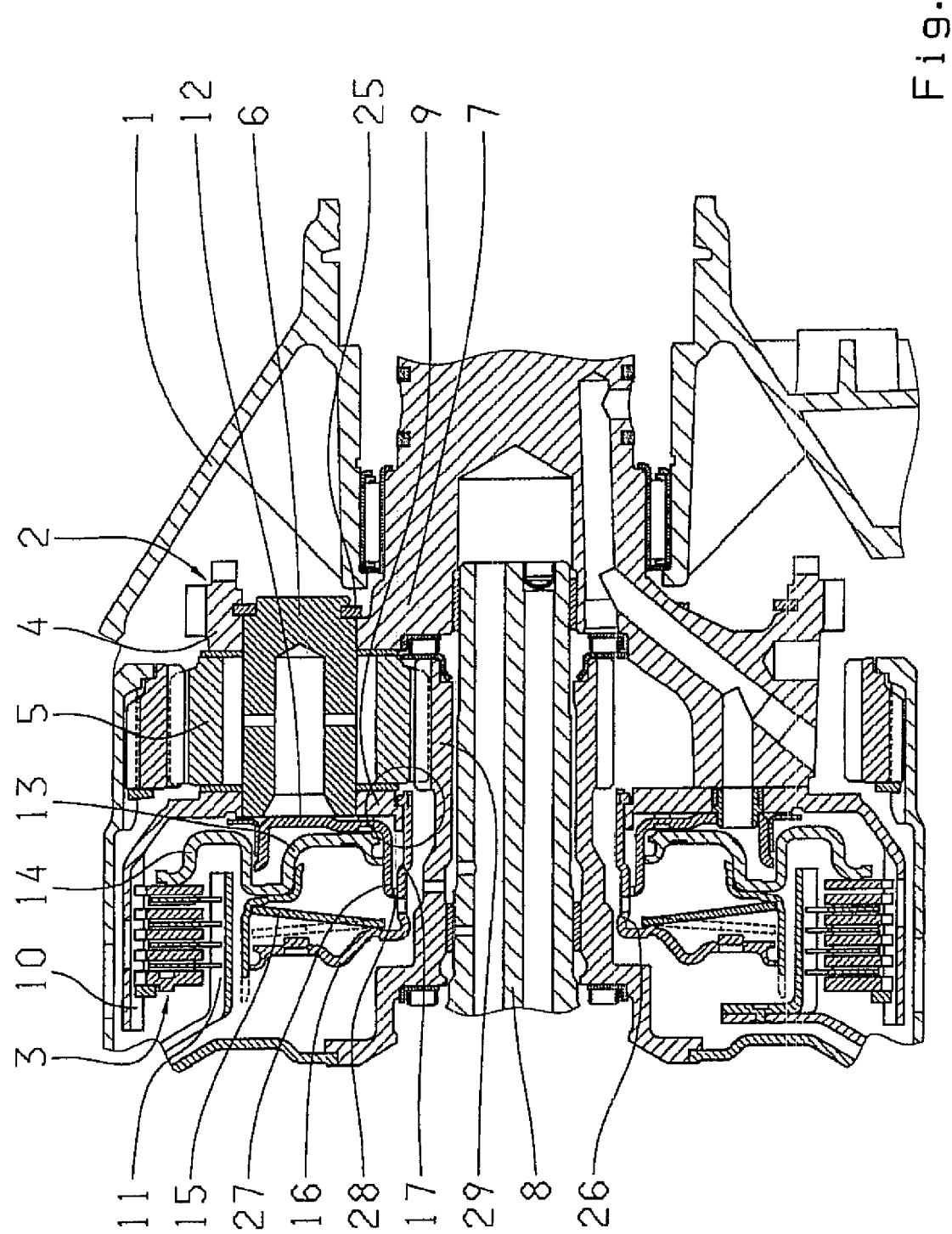
FIG. 1 is a schematic sectional view of a possible example embodiment of an arrangement of a planetary gearset with an axially adjacent shift element.
Figure 1A:
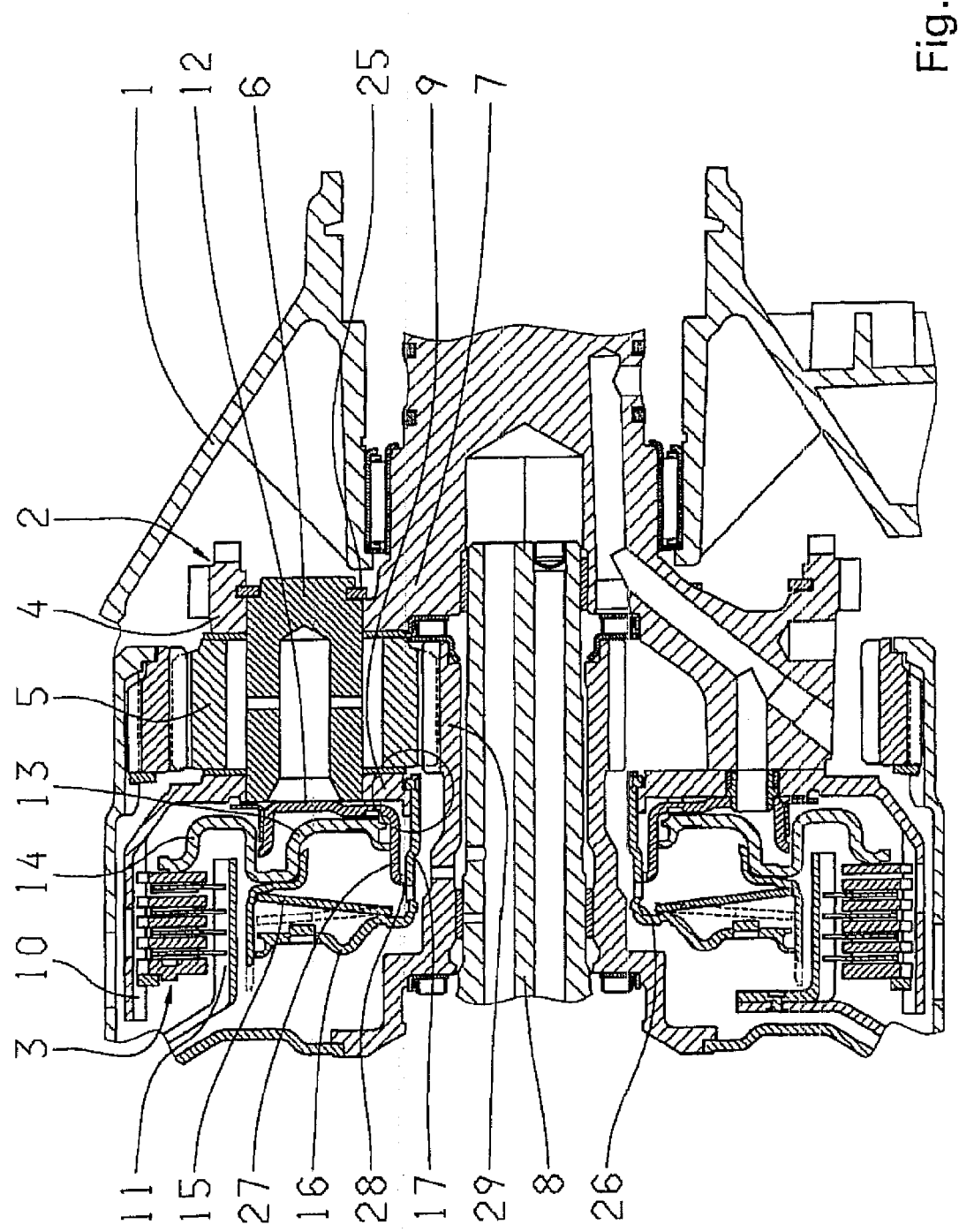
FIG. 1A is a schematic sectional view of the arrangement shown in FIG. 1, with an alternative design of the annular oil guide duct.

In each case, FIGS. 1 and 1A represent a section of a housing 1 of an automatic transmission for a vehicle, showing an arrangement of a planetary gearset 2 with an axially adjacent shift element. In the example embodiment illustrated, the shift element is made as a clutch 3. Only those components which are necessary for understanding the invention are described and indexed.

The planetary gearset 2 comprises a planetary gear carrier 4 with planetary gears 5, each mounted on the planetary gear carrier 4 by way of a respective planetary gear bolt 6. The planetary gear carrier 4 has a hub 7 fitted on a drive shaft 8. In addition, the planetary gear carrier 4 comprises at least one carrier plate 9 with bores to receive the planetary gear bolts 6 on which the planetary gears 5 are then mounted to rotate.

In addition, an outer disk carrier 10 of the clutch 3 is provided on the carrier plate 9. The outer disk carrier 10 has outer disks which engage, in alternation, with inner disks held on an inner disk carrier 11. The clutch 3 has an annular cylinder 12 in which an annular piston 13 is held and can slide, and which, together with the annular cylinder 12, forms a pressure chamber. The annular piston 13, formed as a sheet component, has a pressure ring 14 extending radially outward, which is located in the area of the disk set of the outer disk carrier 10. Furthermore, a cup spring 15 is provided for restoring the annular piston 13. As the abutment support for the cup spring 15, a diaphragm plate 16 is provided.

A detachable connection is made between the clutch 3 and the planetary gearset 2. This detachable connection is formed as a bayonet connection on the diaphragm plate 16 and the carrier plate 9 of the planetary gear carrier 4. For this, a sleeve section 17, extending in the axial direction, is provided on the diaphragm plate 16. In FIGS. 1 and 1A, the sleeve section 17 extends through the inside diameter of the carrier plate 9 of the planetary gear carrier 4. Thus, a detachable connection is formed between the clutch 3 and the planetary gear carrier 4 so that retrofitting of individual components, for example when replacing defective components, is possible. In this way, the costs of waste can be reduced and recycling of the transmission is simplified with the arrangement according to the invention.

Figure 2:
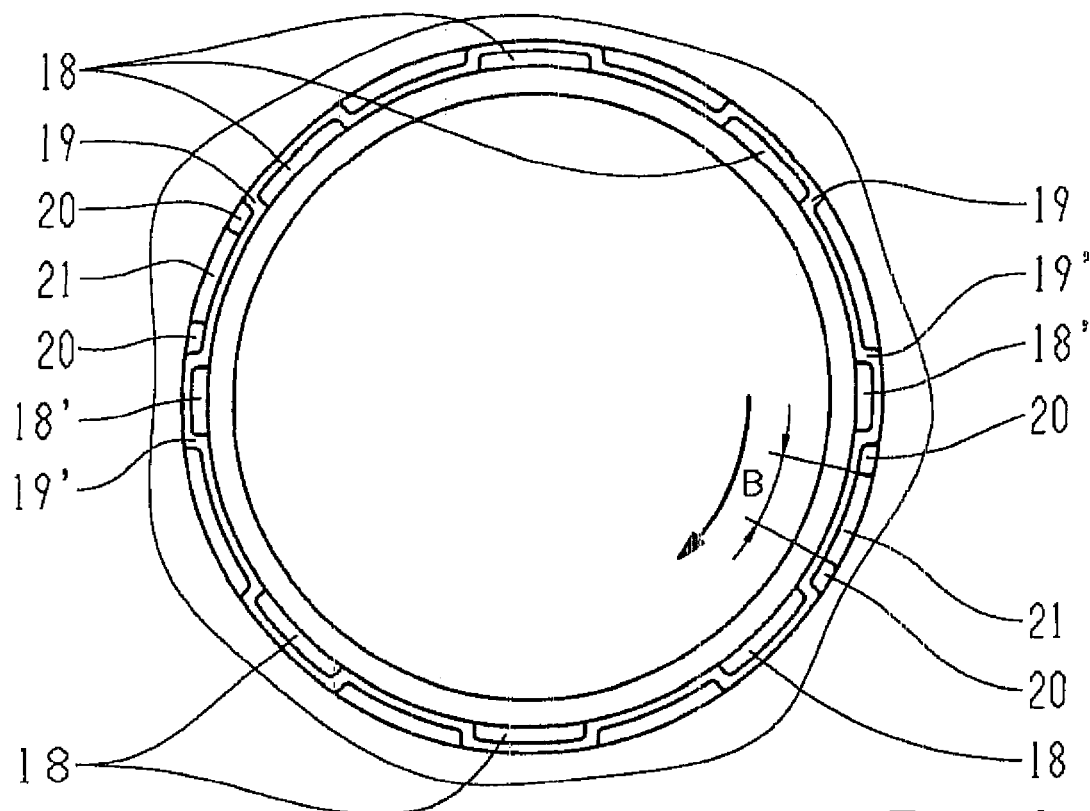
FIG. 2 is a schematic top view of a diaphragm plate on a carrier plate of the planetary gearset during assembly.
Figure 3:
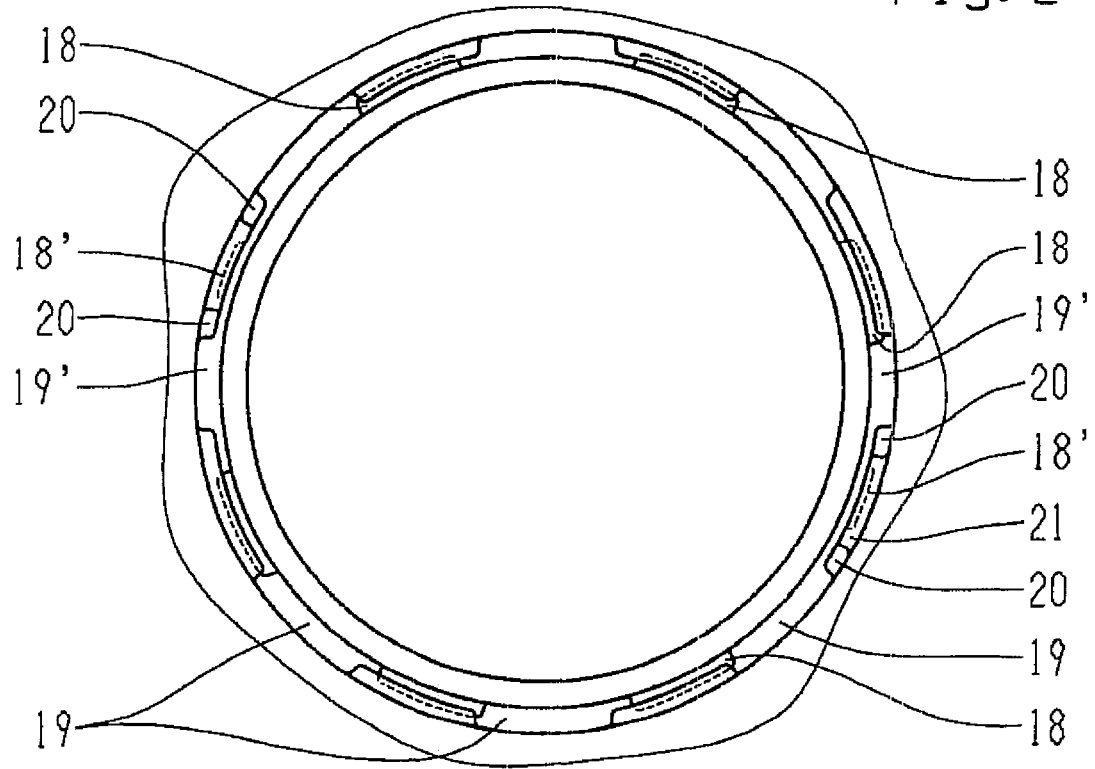
FIG. 3 is a schematic top view of the diaphragm plate on the carrier plate of the planetary gearset in an operating position.

FIG. 2 shows the diaphragm plate 16 and the carrier plate 9 in an assembly position and FIG. 3 shows an operating position of the diaphragm plate 16 after assembly on the carrier plate 9.

To mount the diaphragm plate 16 on the carrier plate 9, the sleeve section 17 with a plurality of radial projections 18, 18' is inserted into corresponding mounting recesses 19, 19' in the inside diameter of the carrier plate 9 in the axial direction. To ensure correct fitting of the diaphragm plate 16, the projections 18, 18' are made with different sizes in the circumferential or tangential direction. In the embodiment illustrated, six projections 18, which are wider in the circumferential direction, and two projections 18', which are narrower in the circumferential direction, are provided. The projections 18' is arranged offset at an angle of about 180° relative to one another around the circumference of the sleeve section 17 of the diaphragm plate 16.

The projections 18 are each about 8 mm wide and their associated mounting recesses 19 are about 10 mm wide, whereas the projections 18' are each about 5 mm wide and their associated mounting recesses 19' are about 7 mm wide. Other sizes are possible. Because of the different width of the projections 18, 18', the diaphragm plate 16 can only be fitted in a particular assembly position through the corresponding assembly recesses 19, 19' of the carrier plate 9.

After introducing the sleeve section 17 of the diaphragm plate 16 into the inside diameter of the carrier plate 9, the operating position of the diaphragm plate 16 is reached by rotating the diaphragm plate 16 by a predetermined angle in the circumferential direction so that the operating position shown in FIG. 3 is reached, in which the diaphragm plate 16 is connected in a rotationally fixed manner to the carrier plate 9. In the embodiment illustrated, the rotation direction is clockwise as indicated by the arrow in FIG. 2, and amounts to about 24°.

Figure 4:
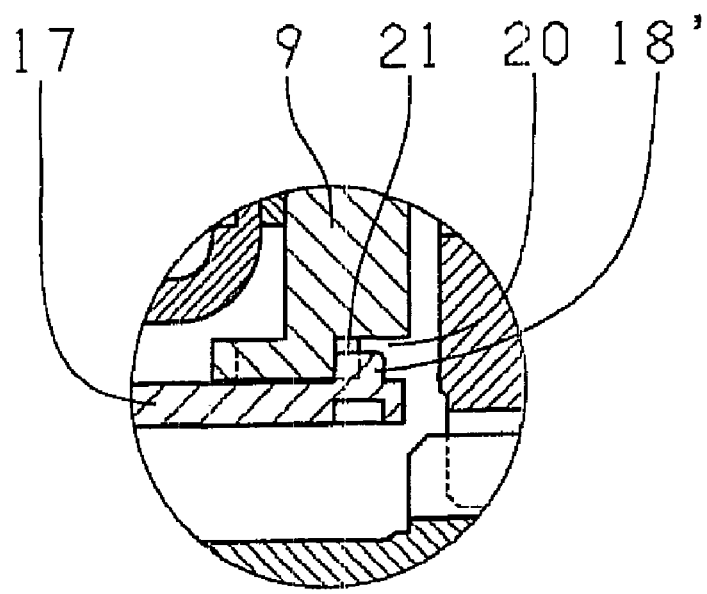
FIG. 4 is a schematic sectional view of a detail in FIG. 1.

FIG. 4 shows a possible design of the bayonet connection between the diaphragm plate 16 and the carrier plate 9, in which the carrier plate 9 has on its inside diameter at least one first recess 20 for the rotation of the diaphragm plate 16 and at least one second recess 21 for the rotationally fixed positioning of the diaphragm plate 16. The recesses 20 and 21 are provided by hollows in the carrier web plate 9, the recess 20 being a hollow less deep in the axial direction and the recess 21 being a deeper hollow.

Since the recess 21 is limited in the circumferential direction to a predetermined size B, the radial projection 18' of the sleeve section 17 can be held in a rotationally fixed manner in the recess 21 by virtue of the force of the cup spring. In the embodiment illustrated, the value B is about 6.2 mm. Other sizes are also possible.

In the design shown in FIG. 4, the sleeve section 17 of the diaphragm plate 16 is first inserted axially along the mounting recesses 19, 19' against the cup spring force and then, with the projections 18' beyond the recesses 20, rotated in the circumferential direction so that after the rotation of the diaphragm plate 16 the projections 18' move into the axially deeper, second recesses 21 because of the cup spring force. This produces the rotationally fixed connection between the diaphragm plate 16 and the carrier plate 9 as also illustrated in FIGS. 3 and 4.

Figure 5:
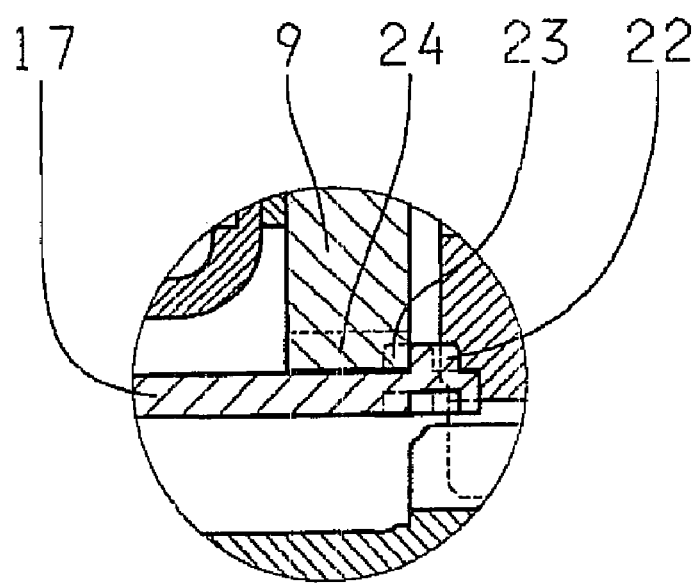
FIG. 5 is a schematic sectional view of alternative of the detail in FIG. 1.

FIG. 5 shows an alternative design of the bayonet connection between the sleeve section 17 and the carrier plate 9. In this design version the sleeve section 17 of the diaphragm plate 16 has at least one first radial projection 22 which comes axially into contact against the carrier plate 9 and at least one second radial projection 23 which is introduced axially and positioned rotationally fixed in a corresponding recess 24 on the inside diameter of the carrier plate 9.

The first projection 22 and the second projection 23 are arranged offset relative to one another in the axial and circumferential directions so that the second projection 23 is positioned rotationally fixed in the associated recess 24, producing a connection between the diaphragm plate 16 and the carrier plate 9. It is possible to provide a plurality of recesses 24 distributed around the circumference, for example in the manner of teeth or suchlike, in which a plurality of corresponding projections 23 can likewise be held.

In this version too, the projections 22, 23 of the sleeve section 17 are inserted in the axial direction against the force of the cup spring into the mounting recesses on the inside diameter of the carrier plate 9 and then made rotationally fixed by virtue of the cup spring force by rotating the diaphragm plate 16 and its sleeve section 17. This brings the first projections 22 into axial contact against the carrier plate 9 and the second projections 23 are held rotationally fixed in the recesses 24.

Regardless of the respective bayonet connection design concerned, to detach the sleeve section 17, it is first moved against the force of the cup spring in the axial direction out of its rotationally fixed position and then rotated in the circumferential direction in the mounting recesses so that thereafter the diaphragm plate 16 can be removed with the aid of the cup spring force in the axial direction out of the inside diameter of the carrier plate 9.

Another advantageous aspect of the present invention is that, owing to the connection between the diaphragm plate 16 and the carrier plate 9, the planetary bolts 6 are held in place against any axial movement in the direction of the clutch 3 by the clamping force of the cup spring 15. In addition, as shown in FIGS. 1 and 1A, the planetary bolts 6 can be axially positively retained by a circlip 25.

To further simplify the design of the oil supply, the sleeve section 17 of the diaphragm plate 16 can have an annular channel 26 on its outside diameter. In this way, an otherwise necessary oil collection sleeve can be omitted. The annular channel or oil collection bead 26 can be produced by deformation, as shown in FIG. 1 or by indentation from the outside inward as shown in FIG. 1A.

A further improvement in relation to lubrication oil supply can be achieved by way of an overflow on the hydrodynamic pressure equalization on the inside diameter of the annular cylinder 12. For this, at least one axial recess 28 for lubrication oil supply can be arranged on a wall section 27 of the annular cylinder 12 of the clutch 3 that faces toward the outer diameter of the sleeve section 17 of the diaphragm plate 16. The recesses 28 can be distributed around the circumference to ensure uniform oil supply. This eliminates the need for otherwise necessary bores in the driveshaft 8 and in a sun gear shaft 29 of the planetary gearset.

REFERENCE NUMERALS 1 housing
2 planetary gearset
3 clutch
4 planetary gear carrier
5 planetary gears
6 planetary gear bolts
7 hub
8 drive shaft
9 carrier plate
10 outer disk carrier
11 inner disk carrier
12 annular cylinder
13 annular piston
14 pressure ring
15 cup spring
16 diaphragm plate
17 sleeve section
18, 18' projections
19, 19' mounting recesses
20 first recess
21 second recess
22 first projections
23 second projections
24 recess
25 circlip
26 annular channel
27 wall section
28 recess for oil supply
29 sun gear shaft
B limiting size of the recess in the circumferential direction

The invention claimed is:

1. An arrangement of a planetary gearset (2) with an axially adjacent shift element in a housing (1) of a transmission of a vehicle, wherein the planetary gearset (2) is connected to the shift element with a detachable connection between the shift element and the planetary gearset (2);

the shift element is a clutch (3) with a cup-spring-loaded diaphragm plate (16) which is detachably connected to a carrier plate (9) of a planetary gear carrier (4) of the planetary gearset (2); and the diaphragm plate (16) has a sleeve section (17) which extends in an axial direction, and the sleeve section (17) is detachably connected to an inside diameter of the carrier plate (9).

2. The arrangement according to claim 1, wherein the sleeve section (17) of the diaphragm plate (16) has at least one radial projection (18, 18') which is inserted into a corresponding axial mounting recess (19, 19') on an inside diameter of the carrier plate (9) to an operating position.

3. The arrangement according to claim 2, wherein the sleeve section (17) of the diaphragm plate (16) has a plurality of projections (18, 18') of different widths which extend in a circumferential direction and are distributed about a circumference, the plurality of projections (18, 18') are inserted in the corresponding axial mounting recesses (19, 19') on the inside diameter of the carrier plate (9) to reach the operating position, and widths of the mounting recesses (19, 19') match the widths of the projections (18, 18') in the circumferential direction.

4. The arrangement according to claim 2, wherein the inside diameter the carrier plate (9) has at least one first recess (20) for rotating the diaphragm plate (16) and at least one second recess (21) for positioning the diaphragm plate (16) in a rotationally fixed manner.

5. The arrangement according to claim 4, wherein the radial projections (18, 18') on the sleeve section (17) of the diaphragm plate (16) are inserted into the axially extending mounting recesses (19, 19') of the carrier plate (9) against the force of a cup spring, and predetermined narrower projections (18') on the sleeve section (17) of the diaphragm plate (16) are moved beyond the mounting recesses (19') through the one first recess (20) by rotation in a circumferential direction through a predetermined angle and locked by the force of the cup spring, in a rotationally fixed manner, in the second recesses (21), which are limited in the circumferential direction and deeper in the axial direction.

6. The arrangement according to claim 1, wherein the sleeve section (17) of the diaphragm plate (16) has at least one first radial projection (22), which makes axial contact on the carrier plate (9), and at least one second radial projection (23), which is introduced axially and positioned in a rotationally fixed manner in a corresponding axial recess (24) on the inside diameter of the carrier plate (9).

7. The arrangement according to claim 6, wherein the second projection (23) is offset axially in a direction of the carrier plate (9) and in a circumferential direction relative to the first projection (22).

8. The arrangement according to claim 6, wherein the projections (22, 23) on the sleeve section (17) of the diaphragm plate (16) are axially inserted through the carrier plate (9) against the force of the cup spring, and the diaphragm plate (16) is rotated through a predetermined angle such that the second projection (23) can be inserted axially into the corresponding axial recess (24) of the carrier plate (9), by virtue of the cup spring force, until the second projection (23) is fixed on the carrier plate (9).

9. The arrangement according to claim 6, the diaphragm plate (16) is rotatable out of its rotationally fixed operating position against the cup spring such that the sleeve section (17) of the diaphragm plate (16) is axially movable out of the carrier plate (9) in an acting direction of the force of the cup spring.

10. The arrangement according to claim 1, wherein planetary gear bolts (6) fitted on the carrier plate (9) are fixed axially, at least in a direction of the shift element, by force of the cup spring transferred to the carrier plate (9).

11. The arrangement according to claim 10, wherein at least one circlip (25) is provided on at least one planetary gear bolt (6) for fixing the planetary gear bolts (6) axially with positive locking.

12. The arrangement according to claim 1, wherein the diaphragm plate (16) has, as an oil collector, an annular channel (26) that extends around the circumference of the sleeve section (17).

13. The arrangement according to claim 12, wherein the annular channel (26) is produced by deformation.

14. The arrangement according to claim 12, wherein the annular channel (26) is produced by an indentation.

15. The arrangement according to claim 1, wherein a wall section (27) of an annular cylinder (12) of the clutch (3) that faces toward an outer diameter of the sleeve section (17) of the diaphragm plate (16) has at least one axial recess (28) around its circumference for lubrication oil supply.

16. The arrangement according to claim 4, wherein the first recess (20) is formed by an indentation, in an axial direction, and the second recess (21) is formed by a deeper indentation.

17. An arrangement of a planetary gearset (2) with an axially adjacent shift element in a housing (1) of a transmission of a vehicle, wherein the planetary gearset (2) is connected to the shift element with a detachable connection between the shift element and the planetary gearset (2); and the detachable connection is a bayonet connection;

the shift element is a clutch (3) with a cup-spring-loaded diaphragm plate (16) which is detachably connected to a carrier plate (9) of a planetary gear carrier (4) of the planetary gearset (2); and the diaphragm plate (16) has a sleeve section (17) which extends in an axial direction, and the sleeve section (17) is detachably connected to an inside diameter of the carrier plate (9).

* * * * *